(No Model.)

T. M. P. CHAPMAN.
SPRING ROLLER.

No. 558,481. Patented Apr. 21, 1896.

Witnesses:
C. F. Kilgore
Frank D. Merchant

Inventor
Truman M. P. Chapman
By his Attorney
Jas. F. Williamson.

ANDREW B. GRAHAM, PHOTO-LITHO, WASHINGTON, D.C.

UNITED STATES PATENT OFFICE.

TRUMAN M. P. CHAPMAN, OF MINNEAPOLIS, MINNESOTA, ASSIGNOR TO ENOCH BROBERG, OF SAME PLACE.

SPRING-ROLLER.

SPECIFICATION forming part of Letters Patent No. 558,481, dated April 21, 1896.

Application filed July 25, 1895. Serial No. 557,079. (No model.)

*To all whom it may concern:*

Be it known that I, TRUMAN M. P. CHAPMAN, a citizen of the United States, residing at Minneapolis, in the county of Hennepin and State of Minnesota, have invented certain new and useful Improvements in Spring-Rollers; and I do hereby declare the following to be a full, clear, and exact description of the invention, such as will enable others skilled in the art to which it appertains to make and use the same.

My invention relates to spring-rollers for curtains and other uses, and has for its object to simplify and improve the construction with a view of greater economy in cost and increased efficiency in action.

To these ends the invention consists of the novel features hereinafter described, and defined in the claims.

The invention is illustrated in the accompanying drawings, wherein, like letters referring to like parts throughout the several views—

Figure 1:
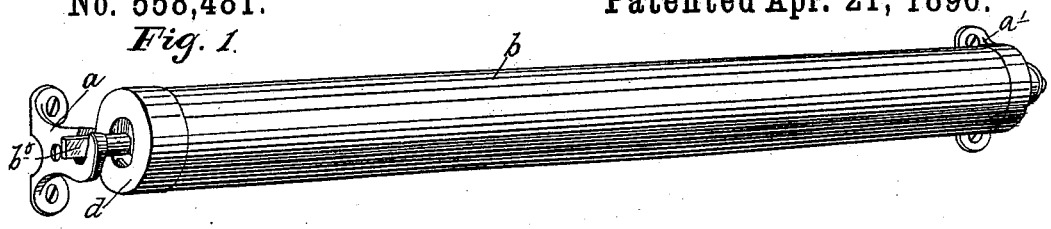
Figure 2:
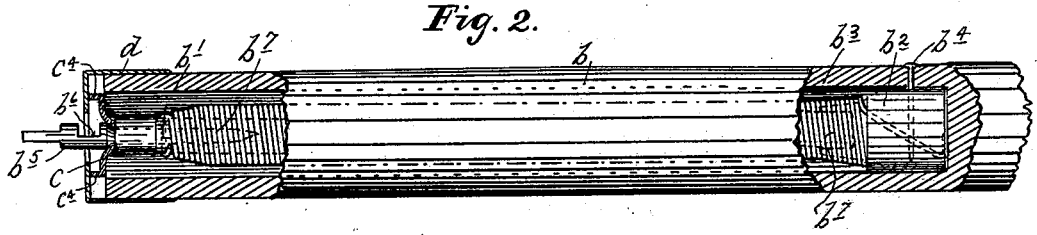
Figure 3:
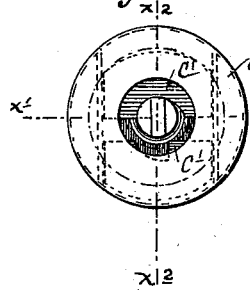
Figure 4:
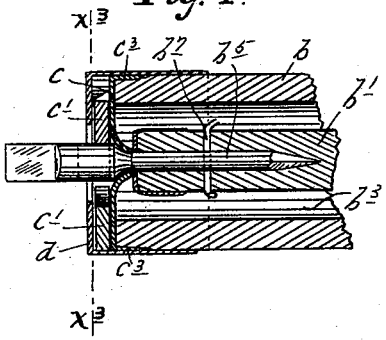
Figure 5:
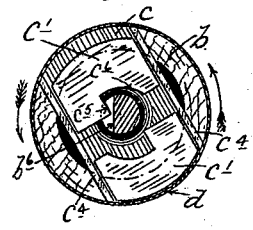
Figure 7:
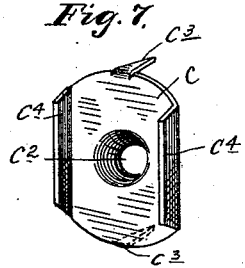
Figure 6:
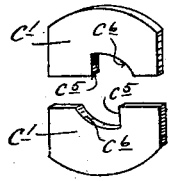
Figure 10:
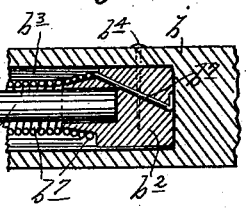
Figure 8:
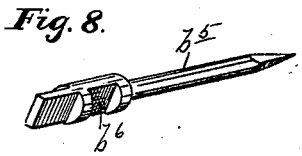
Figure 9:
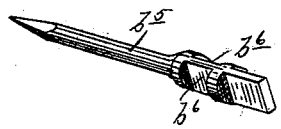

Figure 1 is a perspective view of a spring-roller embodying my invention. Fig. 2 is a view of the roller detached with some parts in elevation and others in section and some portions broken away, the section at the spear end of the roller being on the line $x'$ $x'$ of Fig. 3. Fig. 3 is an elevation of the spear end of the roller shown in Fig. 2. Fig. 4 is an enlarged sectional view of the spear end of the roller on the line $x^2$ $x^2$ of Fig. 3, or at right angles to the section shown in Fig. 2. Fig. 5 is a cross-section of the spear end of the roller on the line $x^3$ $x^3$ of Fig. 4. Fig. 6 is a detail in perspective, showing the locking-dogs detached. Fig. 7 is a detail in perspective of the guide for the said dogs detached. Fig. 8 is a perspective view of the spear detached, and Fig. 9 is a similar view of a modified spear having two flat surfaces instead of one. Fig. 10 is a detail in section, showing the device for connecting the spring to the roller and spring-stick.

$a$ and $a'$ represent the brackets, of the ordinary construction, for mounting the spring-roller $b$. The spring-stick $b'$ with the bearing $b^2$ is mounted in the recess $b^3$ of the roller $b$, with the casting $b^2$ secured to the roller by pin $b^4$ in the usual way. The spear $b^5$ differs from the ordinary construction in being provided either with one flat face $b^6$ or with two, as shown, respectively, in Figs. 8 and 9. The spring $b^7$ is shown as made fast at its outer end to the stick $b'$ and at its inner end to the bearing-casting $b^2$.

To the spear end of the roller proper, $b$, I attach a guide $c$ for the locking-dogs $c'$. This guide $c$ is provided with a central perforation $c^2$ for passing the stem of the spear $b^5$, has a pair of brads $c^3$ for engagement with the end of the roller $b$ to hold the guide in position, and is provided with side flanges $c^4$, which prevent the lateral displacement of the dogs $c'$ and serve as bearings for the ends of the dogs. When the guide $c$ and the dogs $c'$ are placed in position, the roller-cap $d$ is applied in the usual manner and serves to hold all the said parts together in proper working relation on the end of the roller. Otherwise stated, the cap $d$ coöperates with the guide $c$ to hold the dogs $c'$ in proper working relation to the spear $b^5$ and the body $b$ of the spring-roller, as is clearly shown in Figs. 1 to 5 of the drawings.

In virtue of the construction described it is obvious that the dogs $c'$ will be rotated with the roller $b$, while at the same time they are free for radial sliding motion transversely to the axis of the roller on the guide $c$ under the action of gravity and centrifugal force. The said dogs $c'$ are provided with the abrupt shoulders $c^5$ and the cam-surfaces $c^6$, with the said parts on the two dogs in reverse relation to each other. The two dogs are mounted in the guide $c$ on opposite sides of the spear. Hence one or the other of said dogs $c'$ will be in position at every half-turn of the roller to engage with the spear $b^5$ for holding the roller when gravity is permitted to exceed centrifugal force on account of the stopping or checking of the roller. A single dog $c'$ would serve equally well, with the exception that there would be only one point at each revolution of the roller when the dog could engage with the spear. In the engaging action of the dogs $c'$ with the spear the shoulder $c^5$ on the dogs engage with the straight edge or shoulder afforded on the enlarged part of the spear $b^5$ by the flat face $b^6$ when the spear is provided with a single flat face, as shown in Fig. 8. If two flat faces $b^6$ are provided on the spear, as shown in Fig. 9, the only difference is that the roller and spear can never be turned or set in the bracket upside down, or so as to become inoperative for locking the roller wherever stopped.

The spear shown in Fig. 8 must be set in the bracket $a$ right side up, so as to bring the face $b^6$ in opposition to the shoulder $c^5$ on the dog $c'$ when the roller is moving in the winding-up direction or under the action of the spring. With the form of spear shown in Fig. 9 one or the other of the two faces $b^6$ would always face in the right direction for the action just hereinbefore noted.

In the unwinding movement of the roller the cam-surfaces $c^6$ in coöperation with the enlarged part or head of the spear $b^5$ lift the dogs $c'$, so as to permit the same to ride over the spear freely even when bearing against the same by gravity. Of course if the unwinding movement is sufficiently rapid the said dogs will assume their outermost position under the action of centrifugal force and thereby clear the head of the spear in the same manner that they do in the winding-up movement of the roller under the action of the spring.

From the foregoing description it will be seen that this form of locking device is very reliable and efficient.

The device is also extremely cheap to make. All the parts can readily be struck up or stamped out from sheet metal. The guide $c$ and the dog $c'$ require no screw or tacks to hold the same in place, and hence the dogs cannot easily get out of working condition.

By actual usage I have demonstrated the practicability and efficiency of the invention herein described.

What I claim, and desire to secure by Letters Patent of the United States, is as follows:

In a spring-roller, the combination with the spear and spring-stick, of the guides $c$, having the spear-passage $c^2$, the brads $c^3$ and the side flanges $c^4$ all formed integral from a flat piece of metal, the pair of locking-dogs $c'$ having shoulders $c^5$ and cam-surfaces $c^6$, mounted for radial sliding motion on said guide, on opposite sides of the spear, and the roller-cap $d$ coöperating with the guide $c$, to hold the dogs $c'$ in working position, all arranged and operating substantially as described.

In testimony whereof I affix my signature in presence of two witnesses.

TRUMAN M. P. CHAPMAN.

Witnesses:
JAS. F. WILLIAMSON,
C. F. KILGORE.